US012657125B2

(12) United States Patent
Lee et al.

(10) Patent No.: US 12,657,125 B2
(45) Date of Patent: Jun. 16, 2026

(54) DATA STORAGE DEVICE AND OPERATION METHOD THEREOF

(71) Applicants: SK hynix Inc., Icheon (KR); KOREA ADVANCED INSTITUTE OF SCIENCE AND TECHNOLOGY, Daejeon (KR)

(72) Inventors: Seungjun Lee, Daejeon (KR); Junhyeok Jang, Daejeon (KR); Myoungsoo Jung, Daejeon (KR)

(73) Assignees: SK hynix Inc., Icheon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 18/780,135

(22) Filed: Jul. 22, 2024

(65) Prior Publication Data

US 2025/0355798 A1     Nov. 20, 2025

(30) Foreign Application Priority Data

May 14, 2024     (KR) ........................ 10-2024-0063251

(51) Int. Cl.
*G06F 12/02* (2006.01)
*G06F 13/16* (2006.01)
(52) U.S. Cl.
CPC ...... *G06F 12/0246* (2013.01); *G06F 12/0292* (2013.01); *G06F 13/1642* (2013.01)
(58) Field of Classification Search
CPC ............. G06F 12/0246; G06F 12/0292; G06F 13/1642; G06F 2212/7201; G06F 3/0659;
G06F 3/0604; G06F 3/0647; G06F 3/0658; G06F 12/06; G06F 12/1018; G06F 2212/1016; G06F 2212/7202
(Continued)

(56) References Cited

U.S. PATENT DOCUMENTS

| | | | |
|---|---|---|---|
| 2017/0123990 A1* | 5/2017 | Jung | ................... G06F 12/0864 |
| 2020/0110536 A1 | 4/2020 | Navon et al. | |
| 2024/0037024 A1* | 2/2024 | Souda | ................... G06F 12/023 |

FOREIGN PATENT DOCUMENTS

| | | |
|---|---|---|
| KR | 10-2021-0019576 A | 2/2021 |
| KR | 10-2023-0135748 A | 9/2023 |

OTHER PUBLICATIONS

Donghyun Gouk et al., "Amber*: Enabling Precise Full-System Simulation with Detailed Modeling of All SSD Resources," 2018 51st Annual IEEE/ACM International Symposium on Microarchitecture (Micro), Oct. 2018, pp. 469-481, IEEE.

(Continued)

*Primary Examiner* — Hua J Song

(57)     ABSTRACT

A data storage device includes an address estimating circuit configured to generate a start logical address and a request size corresponding to the start logical address from an input logical address corresponding to a write request; an address allocating circuit configured to allocate a target physical address corresponding to the input logical address by using the start logical address, the request size, and the input logical address; and a read queue storing a read command to be provided to a memory device, wherein the address estimating circuit estimates the start logical address considering a probability of the start logical address coexisting in the read queue with the input logical address.

10 Claims, 7 Drawing Sheets

(58) Field of Classification Search
USPC .......................................................... 711/154
See application file for complete search history.

(56) References Cited

OTHER PUBLICATIONS

Nima Elyasi et al., "Exploiting Intra-Request Slack to Improve SSD Performance," Proceedings of the Twenty-Second International Conference on Architectural Support for Programming Languages and Operating Systems, Apr. 2017, pp. 375-388.

Arash Tavakkol et al., "Performance Evaluation of Dynamic p. Allocation Strategies in SSDs," ACM Transactions on Modeling and Performance Evaluation of Computing Systems (TOMPECS), 2016, pp. 1-33, vol. 1, No. 2.

Yang Hu et al., "Exploring and Exploiting the Multilevel Parallelism Inside SSDs for Improved Performance and Endurance," IEEE Transactions on Computers, Jun. 2013, pp. 1141-1155, vol. 62, No. 6.

Thomas M. Kroeger et al.,"The case for Efficient File Access Pattern Modeling," Proceedings of the Seventh Workshop on Hot Topics in Operating Systems, Mar. 1999, pp. 14-19, IEEE.

Dorier Matthieu et al., "Using Formal Grammars to Predict I/O Behaviors in HPC: The Omnisc'IO Approach," IEEE Transactions on Parallel and Distributed Systems, 2015, pp. 2435-2449, vol. 27, No. 8.

Babak Behzad et al., "Pattern-driven Parallel I/O Tuning," Proceedings of the 10th Parallel Data Storage Workshop, Nov. 2015, pp. 43-48.

Jun He et al., "I/O Acceleration with Pattern Detection," Proceedings of the 22nd international symposium on High-Performance Parallel and Distributed Computing, Jun. 2013, pp. 25-36.

Badrul Sarwar et al., "Item-Based Collaborative Filtering Recommendation Algorithms," Proceedings of the 10th International Conference on World Wide Web, 2001, pp. 285-295, https://doi.org/10.1145/371920.372071.

Zujie Ren et al., "Realistic and Scalable Benchmarking Cloud File Systems: Practices and Lessons from AliCloud," IEEE Transactions on Parallel and Distributed Systems, 2017, pp. 3272-3285, vol. 28, No. 11.

Tonglin Li et al., "h5bench: HDF5 I/O Kernel Suite for Exercising Hpc I/O Patterns," Proceedings of Cray User Group Meeting CUG, May 2021.

Shengsheng Huang et al., "The HiBench Benchmark Suite: Characterization of the MapReduce-Based Data Analysis," 2010 IEEE 26th International Conference on Data Engineering Workshops (ICDEW 2010), Mar. 2010, pp. 41-51, IEEE.

Ludmila Cherkasova et al., "Analysis of Enterprise Media Server Workloads: Access Patterns, Locality, Content Evolution, and Rates of Change," IEEE/ACM Transactions on Networking, 2004, pp. 781-794, vol. 12, No. 5.

Martin F. Arlitt et al., "Web Server Workload Characterization: The Search for Invariants," ACM Sigmetrics Performance Evaluation Review, 1996, pp. 126-137, vol. 24, No. 1.

Chulbum Kim et al., "A 512-Gb 3-b/Cell 64-Stacked WL 3-D-NAND Flash Memory," IEEE Journal of Solid-State Circuits, 2017, pp. 124-133, vol. 53, No. 1.

* cited by examiner

S200

Start

S210 — Identify a die and a channel where a candidate plane is located.

S220 — Calculate current cost while executing a write request with the input logical address.

S230 — Calculate future cost while executing a read request with the input logical address.

S240 — Calculate total cost from a weighted average of the current cost and the future cost.

End

FIG. 7

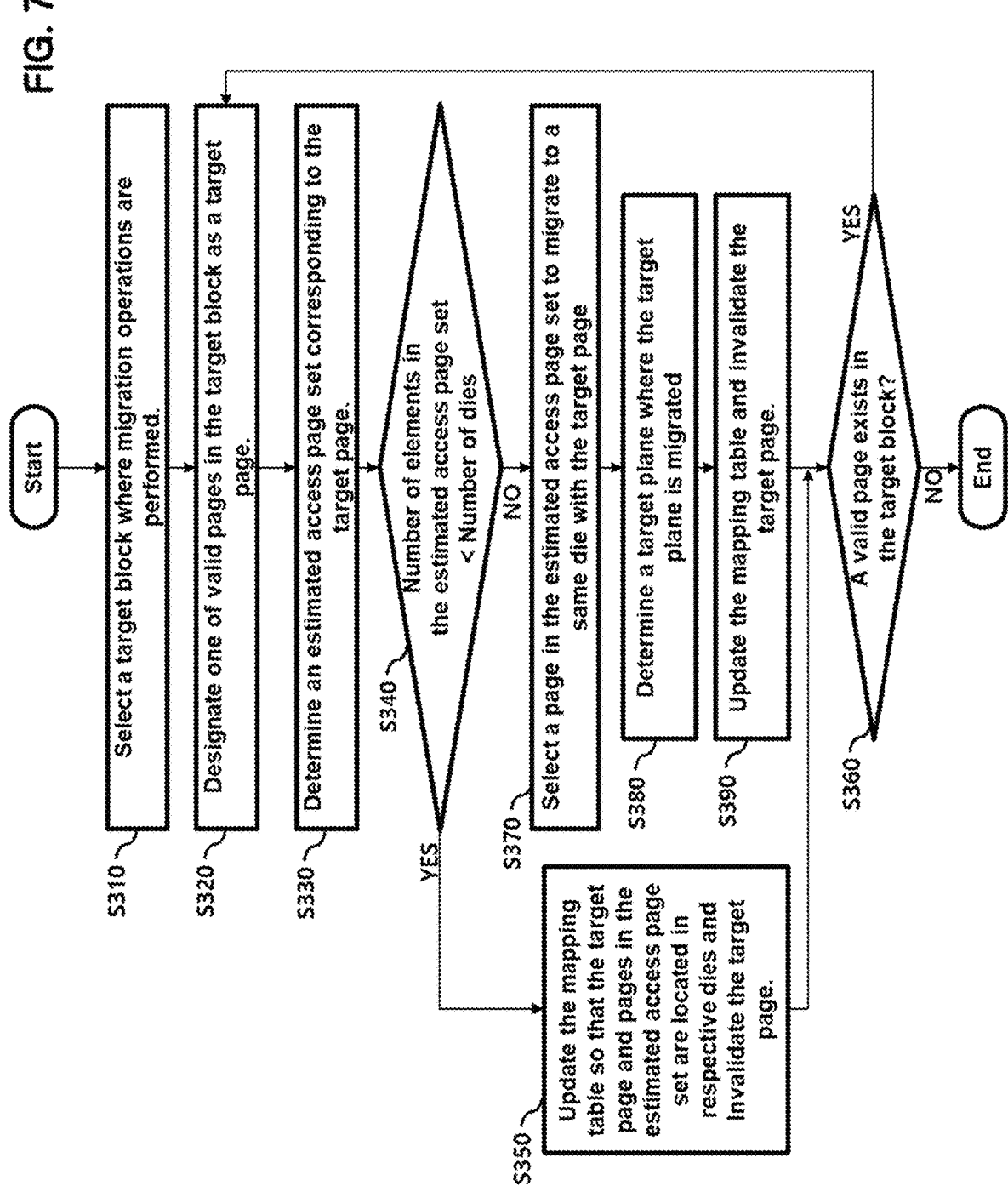

Start

S310  Select a target block where migration operations are performed.

S320  Designate one of valid pages in the target block as a target page.

S330  Determine an estimated access page set corresponding to the target page.

S340  Number of elements in the estimated access page set < Number of dies

YES

S350  Update the mapping table so that the target page and pages in the estimated access page set are located in respective dies and invalidate the target page.

NO

S370  Select a page in the estimated access page set to migrate to a same die with the target page S380  Determine a target plane where the target plane is migrated S390  Update the mapping table and invalidate the target page.

S360  A valid page exists in the target block?

YES

NO

End

DATA STORAGE DEVICE AND OPERATION METHOD THEREOF

CROSS-REFERENCE TO RELATED APPLICATION

The present application claims priority under 35 U.S.C. § 119(a) to Korean Patent Application No. 10-2024-0063251, filed on May 14, 2024, which is incorporated herein by reference in its entirety.

BACKGROUND

1. Technical Field

Embodiments generally relate to a data storage device and an operation method thereof, and more specifically, to a data storage device that ensures parallelism when processing a read request and an operation method thereof.

2. Related Art

A solid state drive (SSD), a type of data storage device containing one or more flash memories, can ensure parallelism for write requests by allocating pages to underutilized resources.

However, a read request for a page should be processed in a physical resource where a requested page was previously stored.

In other words, at the time a read request is processed, data requested to be read is located in a resource allocated when a past write request was processed, so there is a problem in that it may be impossible to secure parallelism for a read request in the same way as for a write request.

SUMMARY

In accordance with an embodiment of the present disclosure, a data storage device may include an address estimating circuit configured to generate a start logical address and a request size corresponding to the start logical address from an input logical address corresponding to a write request; an address allocating circuit configured to allocate a target physical address corresponding to the input logical address by using the start logical address, the request size, and the input logical address; and a read queue configured to store a read command to be provided to a memory device, wherein the address estimating circuit estimates the start logical address considering a probability that the start logical address coexists in the read queue with the input logical address.

In accordance with an embodiment of the present disclosure, an operation method of a data storage device having a memory device having a plurality of dies each having a plurality of planes, the operation method may include estimating a start logical address and a request size corresponding to the start logical address from an input logical address corresponding to a write request; determining a plurality of candidate planes where a target physical address corresponding to the input logical address can be allocated; for each of the plurality of candidate planes, calculating a cost of allocating the target physical address to that candidate plane; and setting a candidate plane having a lowest calculated cost among the plurality of candidate planes as a target plane.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

FIG. 7 is a flowchart showing an operation of a migration control circuit according to an embodiment of the present disclosure.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
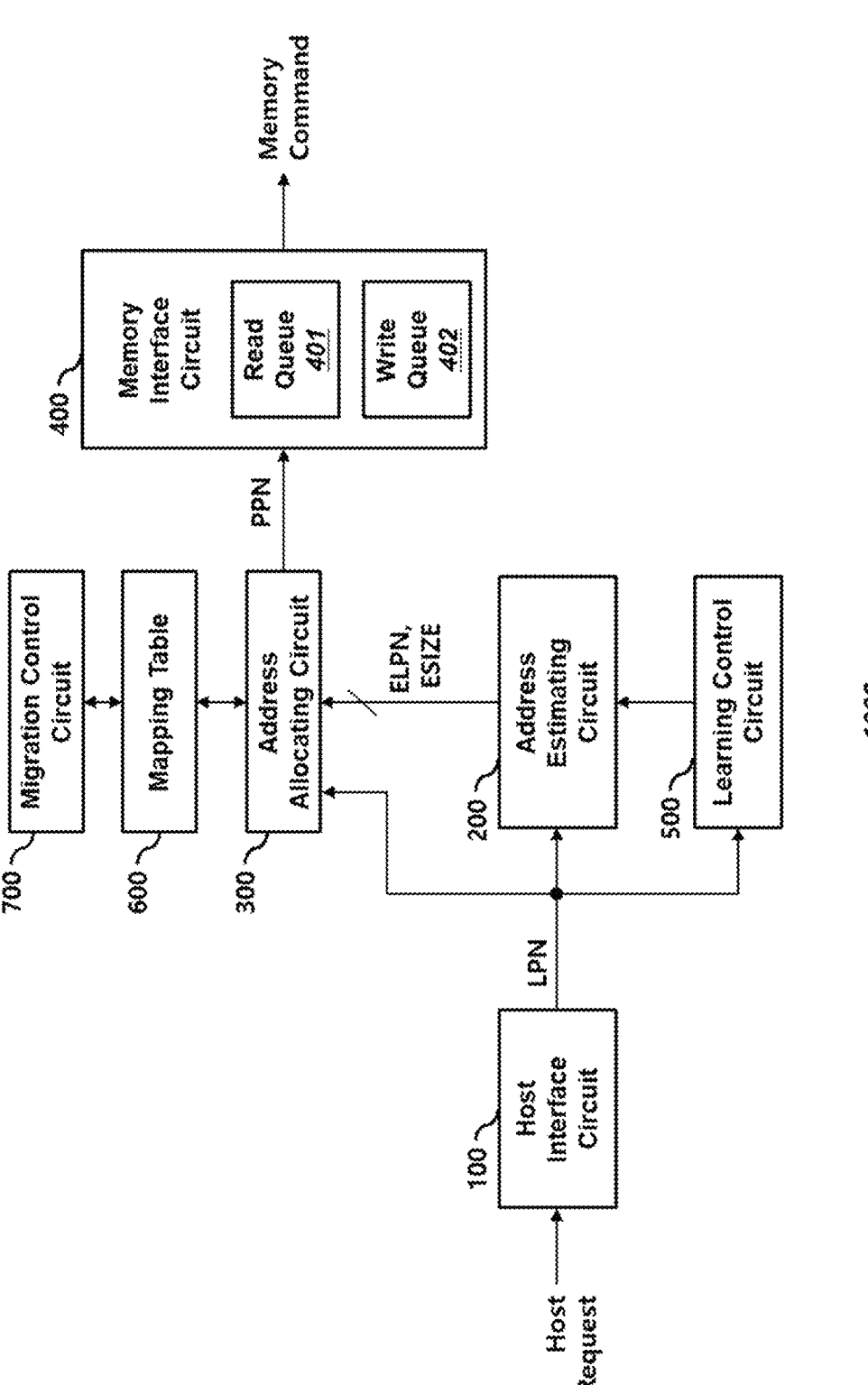
FIG. 1 illustrates components of a data storage device according to an embodiment of the present disclosure.

FIG. 1 is a block diagram showing components of a data storage device 1000 according to an embodiment of the present disclosure. Elements of the data storage device 1000 that are well-known in the related arts (such as memory devices, power supply circuits, etcetera) are omitted in the interest of brevity.

In this embodiment, it is assumed that the data storage device 1000 is a solid state drive (SSD) including one or more flash memory devices, but embodiments are not limited thereto.

The data storage device 1000 includes a host interface circuit 100, an address estimating circuit 200, an address allocating circuit 300, and a memory interface circuit 400.

When the host interface circuit 100 receives a host request, it transmits a requested logical address LPN associated with the host request to the address estimating circuit 200.

The host request that causes the host interface circuit 100 to transmits the requested logical address LPN to the address estimating circuit 200 is assumed to be a write request.

If the host request is a read request, the logical address LPN can be processed in the same manner as in the prior art instead of passing the logical address LPN to the address estimating circuit 200, so detailed description of this will be omitted.

In this embodiment, the logical address LPN is a page-level address and may be referred to as a logical page address.

The host request includes information corresponding to a starting page address and the size of the request, that is, the number of pages requested.

For example, if the host request is a write request, it may be a request to write 10 pages of data starting from the start page address.

The host interface circuit 100 converts a host request into one or more sub-host requests. The sub-host request is a request for one logical page address.

For example, when the host interface circuit 100 receives a host request to write 10 pages from the start address, it sequentially generates 10 sub-host requests to sequentially write 10 pages starting from the start address.

In the present embodiment, while performing a write request, a logical address of data that can be read by a future read request together with the data to be written is estimated, and based on this, a physical address for the write request is allocated that can ensure parallelism while processing the future read request.

Hereinafter, data that can be read together in the future with data requested to be written is referred to as estimated access data.

The memory interface circuit 400 includes a read queue 401 storing a plurality of read commands and a write queue 402 storing a plurality of write commands.

The read queue 401 may store a plurality of physical page addresses corresponding to a plurality of read commands, and the write queue 402 may store a plurality of physical page addresses corresponding to a plurality of write commands.

In this embodiment, a case where read requests for multiple physical page addresses stored in the read queue 401 are processed in parallel is considered. Accordingly, in the present embodiment, a case where two or more pages in the read queue 401 are accessed simultaneously in the parallel processing is considered.

In this embodiment, when the address estimating circuit 200 receives the logical address LPN included in the sub-host request, it simultaneously estimates the start logical address at which the read command will be performed and the size of the estimated access data.

At this time, the logical address LPN input to the address estimating circuit 200 is referred to as the input logical address LPN.

The start logical address of the estimated access data is referred to as the estimated logical address ELPN, and the size of the estimated access data is referred to as the estimated request size ESIZE.

In this embodiment, the address estimating circuit 200 can be implemented using a neural network, and the neural network can be implemented in hardware, software, or a combination thereof and included in the address estimating circuit 200.

There may be multiple estimated logical addresses ELPN provided by the address estimating circuit 200, and there may be multiple estimated request sizes ESIZE corresponding thereto.

The configuration and operation of the address estimating circuit 200 will be described in detail below with reference to FIG. 2-4.

The data storage device 1000 may further include a learning control circuit 500 that controls learning of the neural network included in the address estimating circuit 200.

The learning control circuit 500 may control learning operation of a neural network using pre-accumulated learning data and reflect result of the learning operation in the neural network included in the address estimating circuit 200.

Additionally, the learning control circuit 500 may accumulate read request data as live learning data provided in real time from the host interface circuit 100 and use the live learning data to perform live learning.

Live learning may be performed when the data storage device 1000 is in an idle state.

The learning control circuit 500 may use result of the live learning and reflect the result in the neural network included in the address estimating circuit 200.

The address allocating circuit 300 allocates a physical address PPN corresponding to the input logical address LPN of the write request with reference to the estimated logical address ELPN and estimated request size ESIZE estimated by the address estimating circuit 200.

In this embodiment, the address allocating circuit 300 calculates respective costs of allocating a page to each of a plurality of planes included in the flash memory, selects a plane with the lowest cost, and allocates the page in the selected plane.

A flash memory has a hierarchical structure in the order of a channel, a die, a plane, a block, and a page.

In this embodiment, a parallel processing in the plane level is performed, and to this end, the cost of allocating a page in a plane is calculated.

If a parallel processing at another level is desired, cost based on the another level other than the plane level may be calculated, which will be understood by a person skilled in the art from the disclosure of this embodiment and therefore detailed disclosure thereof will be omitted.

The operation of the address allocating circuit 300 is described in detail below.

The logical address LPN requested to be written and the physical address PPN allocated by the address allocating circuit 300 may be stored in the mapping table 600. Since the mapping table 600 itself is a well-known in the art, detailed description thereof is omitted.

When processing a read request, the address allocating circuit 300 may simply refer to the mapping table 600 and output a physical address PPN corresponding to the requested logical address LPN.

The memory interface circuit 400 generates a memory command to write data to the allocated physical address PPN.

As described above, the memory interface circuit 400 may include the read queue 401 to store a number of memory commands waiting to be issued.

Since the operation to write data to the physical address in the flash memory is the same as the prior art, detailed description thereof will be omitted.

In order to ensure parallel operation in the plane level, it is desirable that two pages allocated to two different planes in one die have the same offset. This allows multiple pages to be read at once using the same word line operation.

However, even if the address allocating circuit 300 calculates the cost and allocates pages, the offsets of the two pages may be set different, and the plane-level parallel operation may not be maintained.

To overcome this problem, the data storage device 1000 may further include a migration control circuit 700.

In this embodiment, the migration control circuit 700 may find a logical page with limited plane-level parallelism, allocate it to a new physical page, and update the mapping table 600 accordingly.

The operation of the migration control circuit 700 is described in detail below with reference to FIG. 7.

Figure 2:
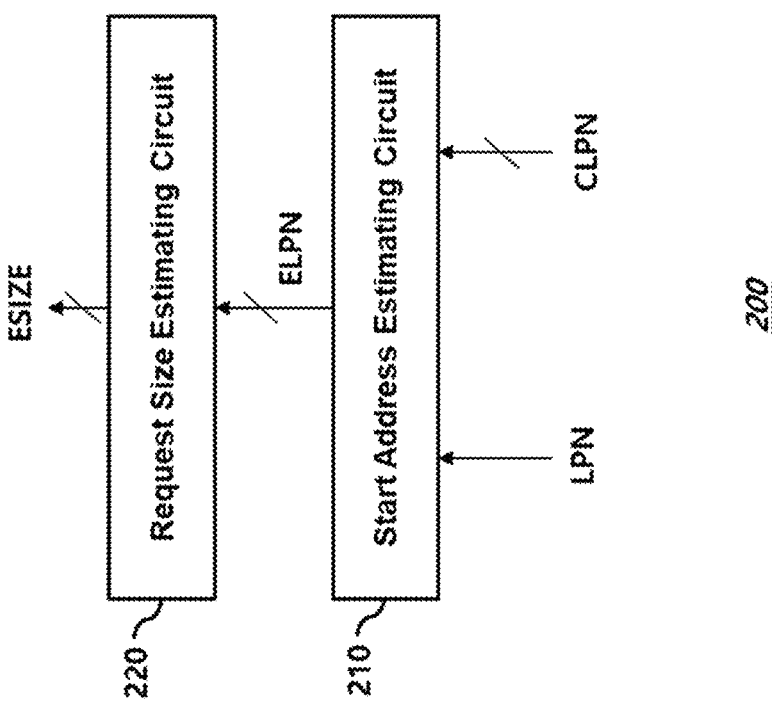
FIG. 2 illustrates an address estimating circuit according to an embodiment of the present disclosure.

FIG. 2 is a block diagram showing an address estimating circuit 200 according to an embodiment of the present disclosure.

The address estimating circuit 200 includes a start address estimating circuit 210 and a request size estimating circuit 220.

The start address estimating circuit 210 operates on a write requested input logical address LPN and a plurality of candidate logical addresses CLPN and generates an estimated logical address ELPN.

The request size estimating circuit 220 receives the estimated logical address ELPN and provides the estimated request size ESIZE corresponding to the estimated logical address ELPN.

The start address estimating circuit 210 may generate a plurality of estimated logical addresses ELPN, in which case the request size estimating circuit 200 may respectively provide a plurality of estimated request sizes ESIZE.

As described above, the address estimating circuit 200 may be implemented using a neural network, and accordingly, the start address estimating circuit 210 and the request size estimating circuit 220 may each be implemented using a respective neural network.

Figure 3:
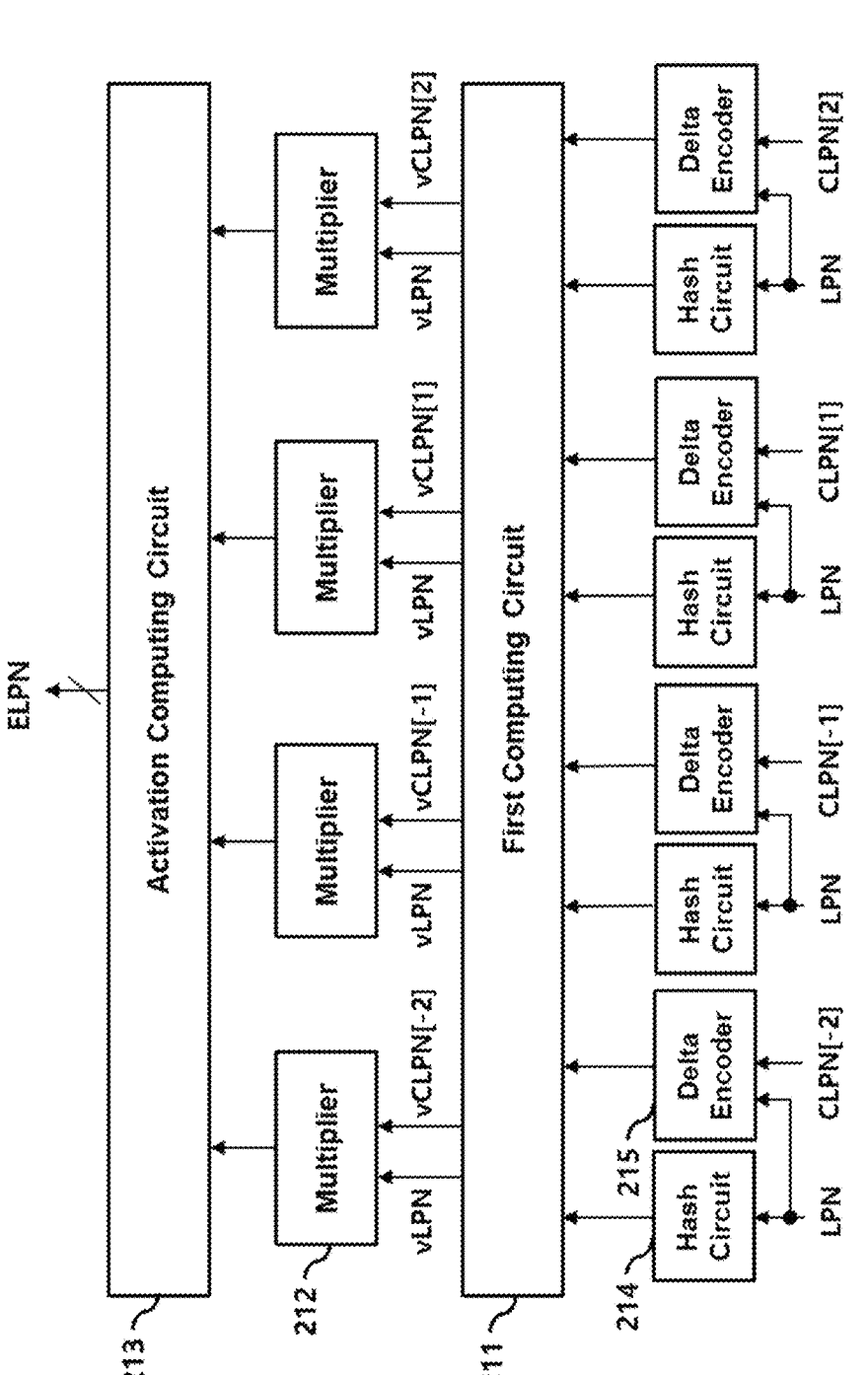
FIG. 3 illustrates a start address estimating circuit according to an embodiment of the present disclosure.

FIG. 3 is a block diagram showing a start address estimating circuit 210 according to an embodiment of the present disclosure.

The input logical address LPN and the plurality of candidate logical addresses CLPN are input.

The plurality of candidate logical addresses CLPN may be selected among addresses adjacent to the input logical address LPN.

FIG. 3 illustrates that four adjacent addresses before (candidate logical addresses CLPN[−1] and candidate logical addresses CLPN[−2]) and after (candidate logical addresses CLPN[1] and candidate logical addresses CLPN[2]) the input logical address LPN are selected as the plurality of candidate logical addresses CLPN, but the number of candidate logical addresses CLPN may be set according to the number of entries that can be stored in the read queue 401.

For example, the number of candidate logical addresses CLPN may be set equal to the number of entries that can be stored in the read queue 401.

The start address estimating circuit 210 includes a first computing circuit 211, a multiplier 212, and an activation computing circuit 213.

The first computing circuit 211 uses an embedding table, which is a type of neural network, and generates an input vector vLPN corresponding to the input logical address LPN and a plurality of candidate vectors vCLPN respectively corresponding to the plurality of candidate logical addresses CLPN.

The embedding table is well known in the art, so detailed disclosure thereof will be omitted.

The multiplier 212 performs a respective multiplication operation between the input vector vLPN and each of the plurality of candidate vectors vCPLN. At this time, the multiplication operation corresponds to a dot product operation of the two input vectors provided to the multiplication operation. The results of the multiplication operations comprise the outputs of the multiplier 212.

FIG. 3 shows four multipliers 212 that perform parallel operations, but the implementation method of the multipliers can be designed in various ways depending on the embodiment.

The activation computing circuit 213 performs an activation operation on the outputs of the multiplier 212, and the result of the activation operation indicates respective probabilities (i.e., probability values) that the input logical address LPN and a corresponding candidate logical address CLPN from among the plurality of candidate logical addresses will be requested simultaneously.

In this embodiment, a sigmoid operation is performed as an activation operation.

The activation computing circuit 213 selects a plurality of estimated logical addresses ELPN from the plurality of candidate logical addresses CLPN by referring to the plurality of probability values corresponding to the plurality of multiplication results.

In this embodiment, a candidate logical address CLPN having a corresponding probability greater than or equal to 50% is selected as an estimated logical address ELPN.

In the above disclosure, it was assumed that the embedding table used in the first computing circuit 211 is accessed using a logical address.

In this case, the number of entries in the embedding table may increase to a number of the entire logical addresses, which may require excessive resources.

Accordingly, the start address estimating circuit 210 may further include a hash circuit 214, and the embedding table is accessed using a hash value generated by applying the input logical address LPN to the hash circuit 214 instead of the input logical address LPN.

In addition, the start address estimating circuit 210 may further include a delta encoder 215, and the embedding table is accessed with a difference value generated by the delta encoder 215 from the input logical address LPN and one of the candidate logical address CLPN instead of using the candidate logical address CLPN itself. In an embodiment, the difference value may correspond to a difference between the input logical address LPN and the one of the candidate logical address CLPN modulo a predetermined modulus.

The hash circuit 214 can reduce the size of the embedding table by reducing the entire logical address area to a smaller hash value area. Additionally, through delta encoding, the entire logical address area can be reduced to the number of candidate logical addresses CLPNs, thereby reducing the size of the embedding table.

At this time, the embedding table may be divided into a first embedding table that generates the input vector corresponding to the input logical address LPN and a second embedding table that generates the candidate vector corresponding to the difference value.

In this case, the embedding table may be generated by multiplying the first embedding table and the second embedding table. Each element of the embedding table corresponds to a probability that a corresponding candidate logical address CLPN will be read simultaneously with the input address LPN.

In the learning process, each element of the first and second embedding tables is updated, and in the inference process, the vector selected from the first embedding table is multiplied by the second embedding table, so that the above-described calculation process can be performed at high speed.

Figure 4:
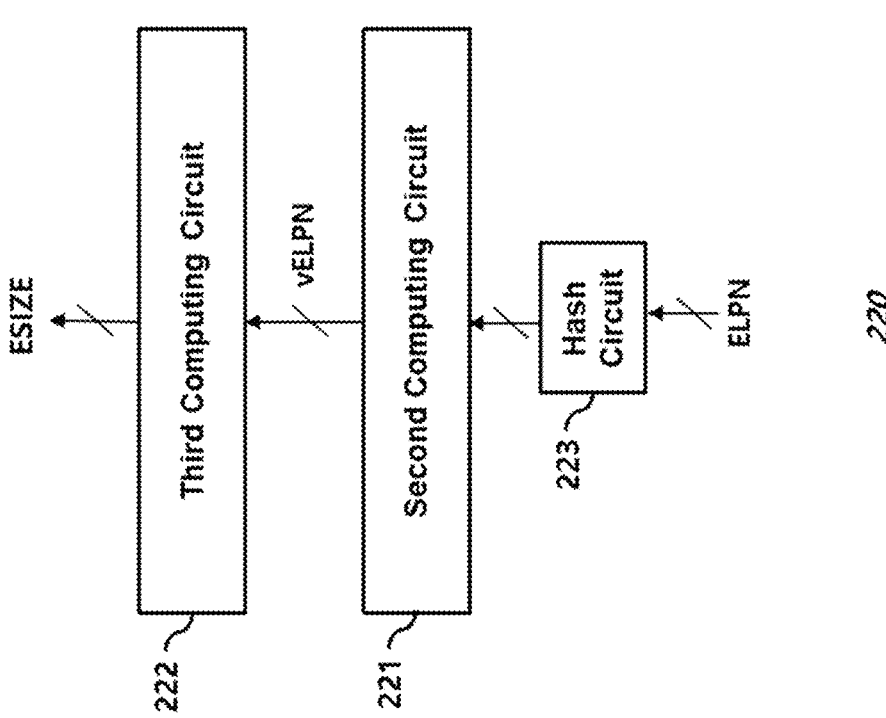
FIG. 4 illustrates a request size estimating circuit according to an embodiment of the present disclosure.

FIG. 4 is a block diagram showing the request size estimating circuit 220 according to an embodiment of the present disclosure.

In FIG. 4, the request size estimating circuit 220 receives the plurality of estimated logical addresses ELPN and outputs the plurality of estimated request sizes ESIZE corresponding thereto.

The request size estimating circuit 220 includes a second computing circuit 221 and a third computing circuit 222.

The second computing circuit 221 performs a neural network operation using an embedding table. In embodiments, the second computing circuit 221 can use the same embedding table used in the first neural network computing circuit 211, thereby saving memory space.

If the embedding table is divided into the first embedding table and the second embedding table as described above, the first embedding table can be used in the second computing circuit 221.

Additionally, as described above, when the logical address itself is input into the embedding table, the memory space of the embedding table may increase excessively.

To prevent this, the request size estimating circuit 220 further includes a hash circuit 223 to access the embedding table using the hash value generated by applying an estimated logical address ELPN to the hash circuit 223.

The second computing circuit 221 generates one estimated vector vELPN corresponding to one estimated logical address ELPN.

In this embodiment, the third computing circuit 222 uses a multi-layer perceptron neural network to generate one expected request size ESIZE corresponding to one estimated vector vELPN.

The plurality of estimated request sizes ESIZE can be generated by repeating the above-described operation for each of the plurality of estimated logical addresses ELPN.

As such, in this embodiment, an embedding table and a multi-layer perceptron neural network are used together, which can make it easier to estimate cases where the request size changes significantly depending on the input logical address.

When using only a multi-layer perceptron neural network without using an embedding table, it is difficult to perform prediction for cases where the request size changes significantly depending on the input logical address.

In contrast, when using an embedding table as in this embodiment, the output vector can vary greatly depending on the logical address input to the embedding table, and through this, the request size predicted through the multi-layer perceptron neural network can also vary significantly.

Figure 5:
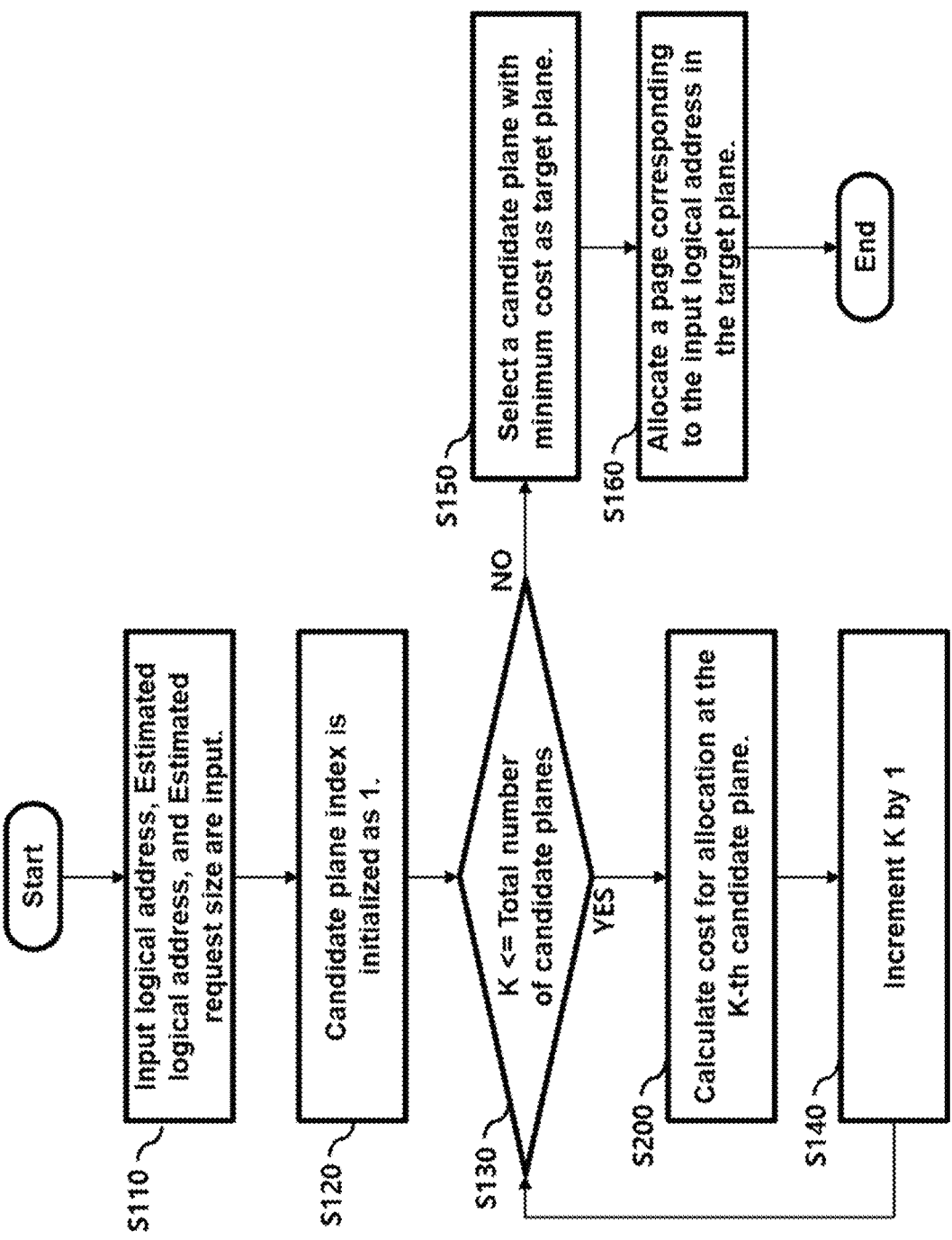
FIG. 5 is a flowchart showing an operation of an address allocating circuit according to an embodiment of the present disclosure.

FIG. 5 is a flowchart showing an operation of the address allocating circuit 300 according to an embodiment of the present disclosure.

In this embodiment, the address allocating circuit 300 allocates a physical address PPN corresponding to the input logical address LPN of a write request to secure parallelism during future read operations by using the plurality of estimated logical addresses ELPN and the plurality of estimated request sizes ESIZE determined for the input logical address LPN.

As described above, a plane-level parallel operation may be desired in the embodiment.

First, the input logical address LPN, the estimated logical address ELPN, and the estimated request size ESIZE are input to the address allocating circuit 300 at S110.

At this time, an estimated access address set containing a plurality of logical addresses that can be accessed simultaneously with the input logical address LPN can be generated from the plurality of estimated logical addresses ELPN and the plurality of estimated request sizes ESIZE.

Hereinafter, an estimated logical address included in the estimated access address set may be referred to as an estimated access address or an estimated access page, and an estimated access address set may be referred to as an estimated access page set.

Next, a candidate plane index K is initialized to 1 at S120.

At this time, a candidate plane refers to a plane where a page to which an estimated logical address ELPN can be allocated.

In this embodiment, all planes existing in the data storage device 1000 are set as candidate planes and one of them is determined as a target plane. In another embodiment, only some planes of the entire planes may be set as candidate planes.

Next, it is determined whether the candidate plane index K is less than or equal to the total number of candidate planes at S130.

If the candidate plane index K is smaller than or equal to the total number of candidate planes, a cost of allocating a page corresponding to the input logical address LPN to the K-th candidate plane is calculated at S200.

The cost calculation operation is disclosed with reference to FIG. 7 below.

Next, the candidate plane index K is incremented by 1 at step S140 and the process goes to the step S130 to repeat the above-described operations.

If the candidate plane index K is greater than the total number of candidate planes at step S130, a candidate plane with lowest cost among a plurality of previously calculated costs corresponding to the plurality of candidate planes is selected as the target plane at S150.

Afterwards, a page corresponding to the input logical address LPN is allocated in the selected target plane at S160.

Figure 6:
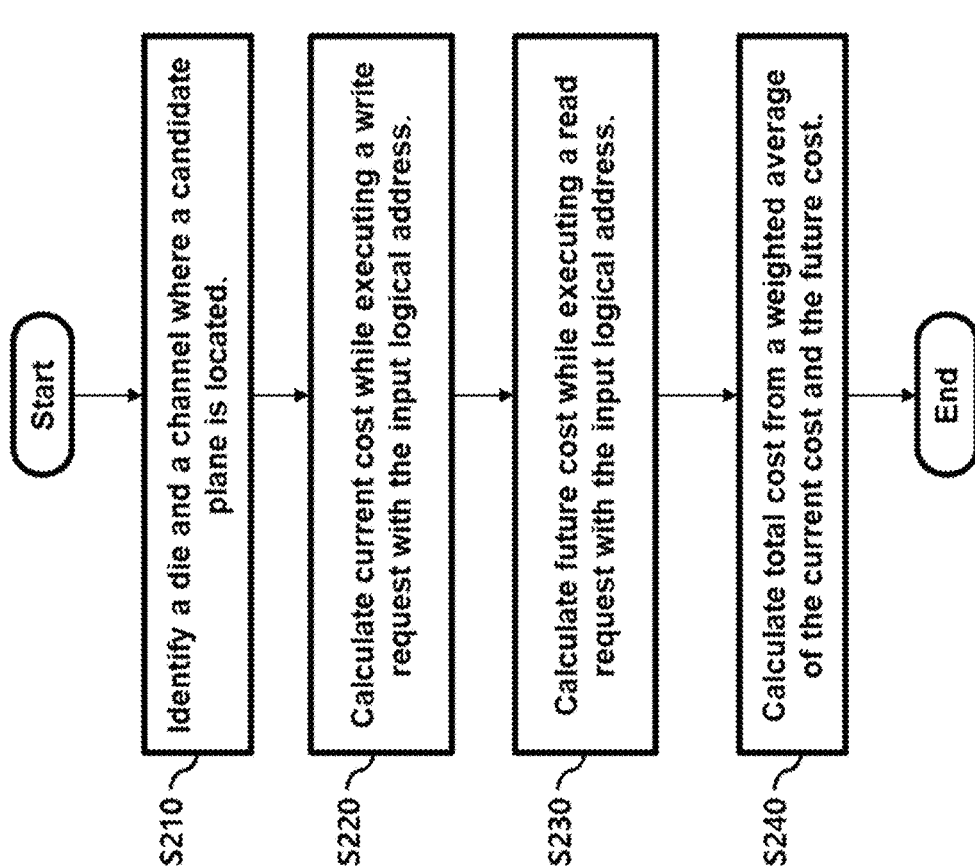
FIG. 6 is a flowchart showing a cost calculation operation according to an embodiment of the present disclosure.

FIG. 6 is a flowchart showing a cost calculation operation at step S200 of FIG. 5 according to an embodiment of the present disclosure.

First, a die and a channel where a candidate plane is located are identified at S210.

For SSD devices, information on a corresponding channel and a corresponding die may be provided through a plane number.

Next, a cost of performing a write request for the input logical address LPN, that is, the current cost, is calculated at S220.

The current cost is calculated based on the cost required to process all commands stored in the write queue 402, assuming that the write command for the input logical address LPN was stored at the end of the write queue 402.

In this case, the cost can be calculated as the sum of the time taken in the channel and the time taken in the die.

Next, a cost of performing a read request for the input logical address LPN, that is, the future cost, is calculated at S230.

As described above, an estimated access address set is determined by the estimated logical address LPN and the estimated request size ESIZE estimated according to the input logical address LPN.

The future cost is calculated from time to process all commands in the read queue 401 by assuming that read commands for addresses included in the estimated access address set are stored in the read queue 401 and a read command corresponding to the input logical address LPN are stored at the end of the read queue 401.

In this case, the cost can be calculated as the sum of the time taken in the channel and the time taken in the die.

This can be performed by converting each estimated access page included in the estimated access address set into a physical address PPN using the mapping table 600 and determining using the corresponding physical address PPN a channel and a die where each estimated access page is located.

Calculating the time it takes to process a read or a write command depending on the address is well known, so detailed descriptions thereof are omitted.

If the number of addresses included in the estimated access address set is greater than the number of commands that can be stored in the read queue 401, it is assumed that the addresses are stored in the read queue 401 in order of probability.

Next, the total cost is calculated from a weighted average of the current cost and future cost at S240.

Since the current cost is related to processing of write requests and the future cost is related to processing of read requests, the weight can be variably determined by considering the load observed over a certain period of time.

For example, by comparing the number of read commands stored in the read queue 401 during a period of time and the number of write commands stored in the write queue 402 during that period of time, the higher the ratio of write commands, the greater a weight for the current cost can be set, and the higher the ratio of read commands, the greater a weight for the future cost can be set.

FIG. 7 is a flowchart showing the operation of the migration control circuit 700 according to an embodiment of the present disclosure.

First, a target block to perform a migration operation upon is selected at S310.

The criteria for selecting the target block may be changed in various ways depending on the embodiment.

In this embodiment, the block with the highest number of reads is selected as the target block during a read reclaim operation mode which is generally supported in flash-based data storage devices. As the read reclaim operation mode is well-known in the art, a description thereof is omitted.

Next, one of the valid pages included in the target block is designated as a target page at S320.

Next, an estimated access page set corresponding to the target page is determined at S330. The estimated access page set corresponds to the estimated access address set described above.

At this time, when the logical address LPN of the target page is provided to the address estimating circuit 200, the estimated access page set can be generated from the one or more estimated logical addresses ELPN and corresponding one or more the estimated request sizes ESIZE produced by the address estimating circuit 200.

Next, the number of estimated access pages, that is, the number of elements in the estimated access page set, and the number of dies are compared at S340.

If the number of dies is greater, the target page and all predicted access pages can be assigned to different dies to ensure die-level parallelism.

Accordingly, the mapping table 600 is updated so that the target page and all predicted access pages are located in different dies, and the target page is invalidated at S350. During this process, some estimated access pages may not require remapping.

Next, it is determined whether another valid page exists in the target block at S360. If a valid page does not exist, the migration operation is terminated. Otherwise, the process returns to the step S320 and the above-described operations are repeated.

At step S340, if the number of estimated access pages is not smaller than the number of dies, die-level parallelism is not secured and at least one estimated access page is located in the same die as the target page.

Accordingly, a page to be moved to the same die as the target page is selected from the estimated access page set at S370.

In this case, it is desirable to ensure parallelism at the plane level for multiple pages migrated to the same die. For this purpose, it is desirable for multiple pages to be allocated to different planes of the same die.

Therefore, if there are four planes on one die, up to three pages can be selected from the estimated access page set.

The criteria for selecting a page to move together with the target page may be changed in various ways depending on embodiments.

First, one or more pages can be selected in order of highest estimated access probability.

Second, if a page located on the same die as the target page exists in the set of estimated access pages, that page can be selected with priority.

Third, a random page can be selected from the set of estimated access pages.

In addition, various criteria can be applied, and the types and order of application of the applied criteria can be changed in various ways depending on embodiments.

In this embodiment, it is assumed that unselected pages in the estimated access page set are not remapped.

Next, the target plane to migrate the target page to is determined at S380.

Remapping a target page and multiple estimated access pages is equivalent to performing multiple read and write commands.

As aforementioned, cost can be calculated from the processing time of the read and write commands performed in the process of remapping the target page and the multiple estimated access pages to each of the multiple candidate planes, and the candidate plane requiring the lowest cost may be selected as the target plane.

The target page and multiple estimated access pages are remapped according to the remapping method corresponding to the lowest cost, the mapping table 600 is updated accordingly, and the target page is invalidated at S390.

Next, the process goes to the step S360 and the above-described operations are repeated.

Through the above migration operation, even if plane-level parallelism is broken during usage of the data storage device, the plane-level parallelism can be recovered.

Although various embodiments have been illustrated and described, various changes and modifications may be made to the described embodiments without departing from the spirit and scope of the invention as defined by the following claims.

What is claimed is:

1. A data storage device comprising:

an address estimating circuit configured to generate a start logical address and a request size corresponding to the start logical address from an input logical address corresponding to a write request;

an address allocating circuit configured to allocate a target physical address corresponding to the input logical address by using the start logical address, the request size, and the input logical address; and a read queue configured to store a read command to be provided to a memory device, wherein the address estimating circuit estimates the start logical address considering a probability that the start logical address coexists in the read queue with the input logical address.

2. The data storage device of claim 1, wherein the address estimating circuit includes:

a start address estimating circuit configured to generate the start logical address from the input logical address and a plurality of candidate logical addresses; and a request size estimating circuit configured to estimate the request size from the start logical address.

3. The data storage device of claim 2, wherein the start address estimating circuit includes:

a plurality of multipliers configured to generate a first embedding vector corresponding to the input logical address using an embedding table and a plurality of second embedding vectors corresponding to the plurality of candidate logical addresses; and an activation computing circuit configured to generate the start logical address from outputs of the plurality of multipliers.

4. The data storage device of claim 3, wherein the start address estimating circuit further includes:

a hash circuit configured to generate a hash value corresponding to the input logical address;

a delta encoder configured to generate a plurality of difference values from the input logical address and the plurality of candidate logical addresses; and a first computing circuit configured to generate the first embedding vector and the plurality of the second embedding vectors by using the hash value and the plurality of the difference values, respectively.

5. The data storage device of claim 3, wherein the request size estimating circuit includes:

a second computing circuit configured to generate a third embedding vector corresponding to the start logical address by using the embedding table; and a third computing circuit configured to generate the request size from the third embedding vector.

6. The data storage device of claim 5, wherein the request size estimating circuit further includes a hash circuit to generate a hash value with the start logical address, and wherein the second computing circuit generates the third embedding vector by applying the hash value to the embedding table.

7. The data storage device of claim 1, wherein the address allocating circuit is configured to:

select a plurality of candidate addresses corresponding to the target physical address, for each of the plurality of candidate addresses, calculate a corresponding read processing cost for processing the read queue that stores a read command for that candidate address and stores a plurality read commands corresponding to the request size, and determine a candidate address having a lowest read processing cost from among the plurality of candidate addresses as the target physical address.

8. The data storage device of claim 1, further comprising:

a mapping table storing a relation between a logical address and a physical address; and a migration control circuit configured to update the relation in the mapping table, wherein the migration control circuit is configured to:

select a target page in a block among the plurality of blocks of the memory device, generate a plurality of estimated access pages from the start logical address and the request size by providing a logical address of the target page to the address estimating circuit, and update the mapping table so that one of the estimated access pages and the target page are allocated to new pages.

9. The data storage device of claim 8, wherein the migration control circuit updates the mapping table so that the plurality of estimated access pages and the target page are allocated to respective dies when the number of the plurality of the estimated access pages is smaller than the number of dies.

10. The data storage device of claim 8, wherein the migration control circuit migrates one of the plurality of estimated access pages and the target page to two new pages in a die when the number of the plurality of the estimated access pages is not smaller than the number of dies, and wherein the two new pages have the same offset when the two new pages are included in respective planes.

* * * * *